United States Patent [19]

Culley

[11] Patent Number: 5,027,313

[45] Date of Patent: Jun. 25, 1991

[54] APPARATUS FOR DETERMINING MAXIMUM USABLE MEMORY SIZE

[75] Inventor: Paul R. Culley, Cypress, Tex.

[73] Assignee: Compaq Computer Corporation, Houston, Tex.

[21] Appl. No.: 236,620

[22] Filed: Aug. 25, 1988

[51] Int. Cl.⁵ .............................................. G06F 12/02
[52] U.S. Cl. ................................... 364/900; 364/970;
364/970.5; 364/965.77; 364/929.4
[58] Field of Search ... 364/200 MS File, 900 MS File

[56] References Cited

U.S. PATENT DOCUMENTS

| | | | |
|---|---|---|---|
| 4,025,903 | 5/1977 | Kaufman et al. | 364/200 |
| 4,303,993 | 12/1981 | Panepinto, Jr. et al. | 364/200 |
| 4,330,825 | 5/1982 | Girard | 364/200 |
| 4,545,010 | 10/1985 | Salas et al. | 364/200 |
| 4,571,676 | 2/1986 | Mantellina et al. | 364/200 |
| 4,654,787 | 3/1987 | Finnell et al. | 364/200 |
| 4,740,916 | 4/1988 | Martin | 364/900 |
| 4,860,252 | 8/1989 | Sykora | 364/900 |

Primary Examiner—Eddie P. Chan
Attorney, Agent, or Firm—Pravel, Gambrell, Hewitt, Kimball & Krieger

[57] ABSTRACT

An apparatus for determining maximum usable memory size is disclosed. Permanent connections on a base memory unit and additional memory modules provide signals indicative of the amount of memory installed at each location. The signals are read by the processor and used in conjunction with a lookup table or size counting method to determine maximum usable memory size and the existence of installation or operation errors. The maximum size is written to a latch which provides the value to logic which enables the appropriate memory locations when addressed by the processor.

7 Claims, 4 Drawing Sheets

APPARATUS FOR DETERMINING MAXIMUM USABLE MEMORY SIZE

BACKGROUND OF THE INVENTION

1. Field of the Invention

The invention relates to memory systems used in computers, and more particularly, to automatically determining the maximum usable memory size.

2. Discussion of the Prior Art

The number of areas where personal computers are being utilized is growing dramatically. The areas are varied, and as a result, have different requirements for the various subsystems forming a complete computer system. For example, personal computers used primarily for word processing have relatively modest requirements for installed memory and processor subsystems, have very high performance requirements for the mass storage subsystem and have varying requirements for the display subsystem, depending on the exact application, such as high resolution desktop publishing or simpler letter production, being performed. A data storage and retrieval oriented system needs larger amounts of memory, a faster processor, may have lesser mass storage requirements and generally has minimal display requirements. Complex spreadsheet applications require very large amounts of memory, high performance processors, average capability mass storage subsystems and have display requirements which vary depending on whether complex graphic presentations are desired. Simple spreadsheet applications need standard amounts of memory, average performance processors, average capability mass storage subsystems and have the same display requirements as complex spreadsheet applications. Computer automated design systems require large amounts of memory, very high performance processors, high performance mass storage systems and very high performance display components.

Because of production volume requirements and the reduced costs as volumes increase, it is desirable that as many common features as possible are combined into high volume units. This has happened in the personal computer area by developing basic units of varying processor performance levels, with the other subsystems incorporated by the inclusion of interchangeable modules. Modules of the desired performance level are incorporated into the basic unit to tailor the basic processor unit to the desired complete computer system. Because of the inherent flexibility of this design approach, it becomes difficult to develop a single piece of software to control the system. The software cannot depend on a given configuration being present and so arrangements must be made to allow the software to understand the specific configuration. Additionally, the provisions must be made so the various modules forming the subsystems do not interfere with each other.

The software and hardware configuration problems are quite true in memory subsystems where it is common for the subsystem to be originally installed by a system integrator at one level and then changed by a relatively unskilled user. The change is performed by adding memory integrated circuits, either into previously available locations in a preexisting module, or changing the number or type of incorporated memory modules. This situation is further complicated because personal computers related to or compatible with products produced by International Business Machines Corporation have undergone a very complicated memory expansion path because of limitations in the various processors, operating systems, and designs which have developed over the years. As a result, various competing systems and memory allocation conflicts have developed, so that determining and setting memory size and location is extremely difficult.

Conventionally, indication of memory size and location is performed by appropriately setting switches or jumpers provided by the manufacturer of the memory subsystem. This has required that the person installing or upgrading the memory subsystem have a good knowledge of the environment, that is, the intended size of the memory components and location where they are to be located, both physically and in the address space of the computer, and where any other existing memory subsystem components are located. This knowledge requirement either makes the installation very difficult for the unskilled owner or requires installation by a skilled person, usually at a relatively large expense. The unskilled owner must try and follow the often difficult to interpret instructions and hope to get everything right. If not, the owner must try again, thereby expending valuable time. After a sufficient number of unsuccessful attempts, the unskilled owner generally contacts a skilled individual for assistance. Thus, much time and effort is expended with minimal results.

It is desirable that the memory size and address location be determined automatically and that any determined errors be indicated to the installer, to allow a minimum of time and effort to be expended when installing or modifying a memory subsystem. Additionally, it is desirable that portions of a given memory module can be temporarily disabled by software so special modules which must reside only at given locations can be incorporated into and utilized by the computer system without having to repeatedly remove a module and alter various switches or jumpers.

SUMMARY OF THE INVENTION

The present invention is an apparatus for automatically determining the maximum amount of memory available and its physical and address locations, determining if the memory is correctly installed, indicating any errors to the operator and enabling the maximum usable amount of memory. An apparatus according to the present invention includes a base memory unit which includes a series of permanently enabled signals to indicate the amount of memory on the base unit. The signals are provided to a buffer which is connected to the data bus, enabling the processor to read the state of the signals provided to the buffer. The base unit has a series of connectors for addition of memory modules. Each memory module includes a series of permanently enabled signals to indicate the amount of memory installed on the module. These signals are transmitted from the memory module to the buffer on the base unit. If no memory module is installed in a given connector, the signals associated with that connector are set at a predefined level.

The processor reads the buffer to determine the states of the various permanently enabled configuration signals of the base unit and any installed memory modules. The processor then uses this determined value to access a lookup table. The data in the lookup table may indicate the maximum amount of usable memory for the given configuration signal value and indicates if any errors in configuration or operation are present. The processor may use the lookup table data to write to a setup port to enable the maximum usable amount of memory or may use the configuration signal value directly to determine the maximum available memory size and write the appropriate size to the setup port. The lookup table data is utilized to indicate any determined location errors to the operator. The setup port provides the information written to it to memory addressing control logic on the base unit so that only the appropriate memory locations can be accessed.

Optionally, the processor can determine the amount of memory desired by owner and compare this with the usable amount available. The lesser of the two values is written to the setup port to enable the appropriate amount of memory. If the two amounts are not equal, then a warning message can be provided to the operator to indicate the use of this feature. Additionally, the operator can use less than the maximum amount of usable memory by writing a lesser value to the setup port.

Thus, when using an apparatus according to the present invention, the memory installer need not set any switches or jumpers to set the amount of memory enabled by the computer system, allowing installation by relatively unskilled installers with no waste of time or effort. The computer system can prompt the installer should the memory be installed incorrectly or should other errors occur.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

Figure 1:
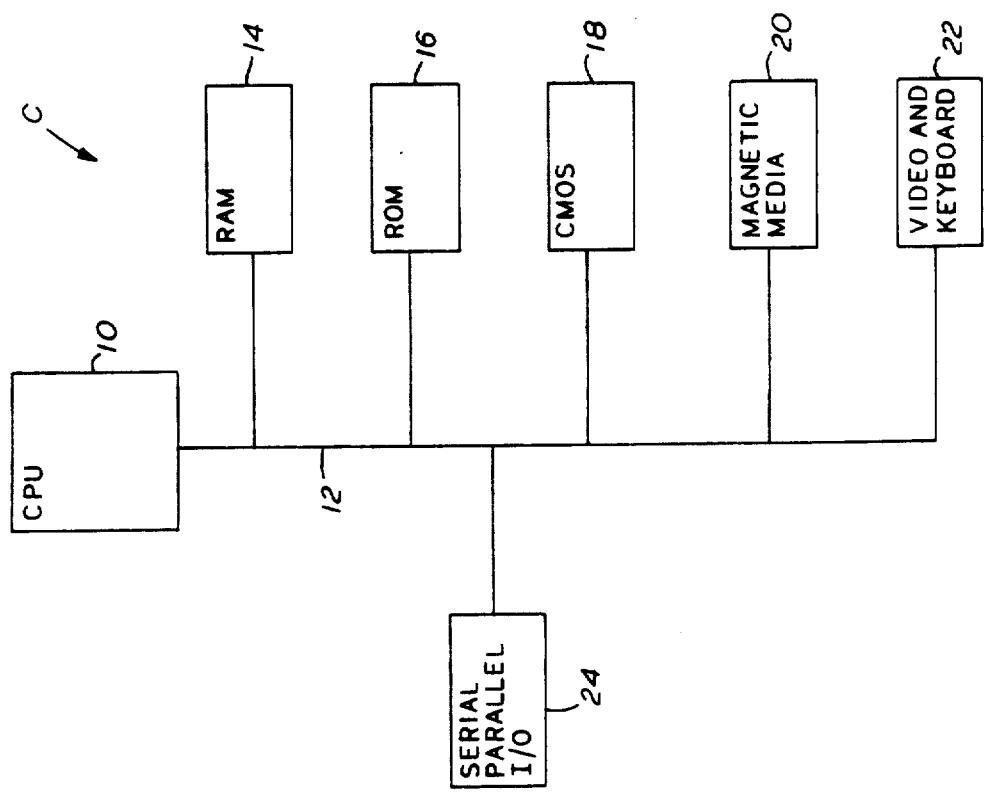
FIG. 1 is a block diagram of a computer system including an apparatus according to the present invention.

Referring now to FIG. 1, a personal computer system, generally referred to by the letter C, includes the apparatus according to the present invention. The personal computer system C is based on a processor 10, commonly a microprocessor such as an Intel Corporation 80286 or 80386. The processor 10 communicates over a bus 12 which includes address lines, data lines and control lines. Coupled to the processor 10 by the bus 12 are a random access memory (RAM) subsystem 14, a main read only memory (ROM) subsystem 16, a CMOS RAM and clock 18, a magnetic media or mass storage subsystem 20, a video controller and keyboard interface subsystem 22, and an input/output subsystem 24, generally having parallel and serial ports.

The processor 10 is the main control element, but has no inherent control program. The main ROM 16 includes a basic operating system which allows the processor 10 to understand and control the various subsystems and interface to more general computer programs.

In addition, the magnetic media subsystem 20, the video and keyboard subsystem 22 and the input/output subsystem 24 generally contain RAM and ROM to allow the individual units with their individual peculiarities to cooperate with the basic operating system contained in the main ROM 16. The basic operating software in the main ROM 16 includes provisions for accessing the magnetic media subsystem 20, generally floppy and hard disk units, to obtain a more extensive general operating system, which is initially located on the media and is relocated to the RAM 14 for operation, and for accessing and loading computer programs resident on the magnetic media. The RAM portion of the CMOS subsystem 18 is used to store various parameters which vary with each computer system C and so cannot be placed in the main ROM 16, but need to be retained so that large amounts of initialization information need not be requested from the operator each time the computer system C is initialized or stored on the magnetic media, which is often interchangeable, resulting in a problem of updating each piece of media when a change in the parameters is made. The RAM 14 provides the general working memory for the computer C, into which application programs and the general operating system are loaded and executed. Because of the previously discussed variations possible, the amount of RAM 14 is often different between computer systems C and is often changed in a given computer system C, resulting in the above-mentioned problems.

The video display and keyboard interface subsystem 22 is used primarily to interact with the operator. The input/output subsystem 24 is used to communicate with various devices such as printers, modems and mice.

The RAM 14 is often contained on a separate board which is inserted into a connector contained on the basic system unit or mother board which contains the processor 10. Alternatively, an amount of RAM 14 can be contained on the basic system unit and additional memory added by means of separate boards. An apparatus according to the present invention can be incorporated into either configuration. In any event, the computer system C needs to know how much RAM 14 is installed and usable. Additionally, the computer system C should preferably indicate if any memory is incorrectly installed or operating, so that the appropriate remedy can be performed. These determinations are done during the initialization or boot up phase and are preferably as simple as possible. When using an apparatus according to the present invention the computer system C automatically determines the amount and address location of the RAM 14 and any erroneous installation or operation.

Figure 3A:
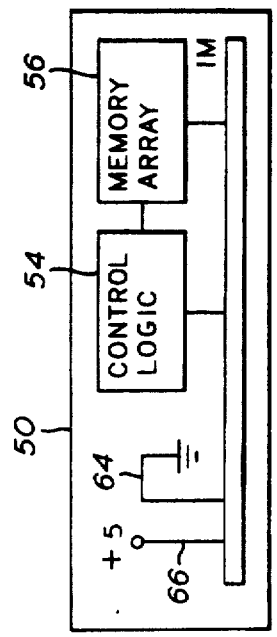
FIGS. 3A and 3B are block diagrams of memory modules for use in an apparatus according to the present invention.
Figure 3B:
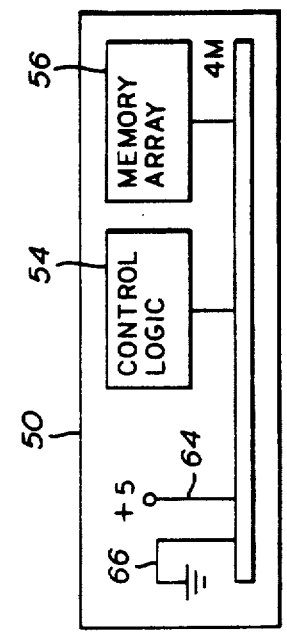
Figure 2:
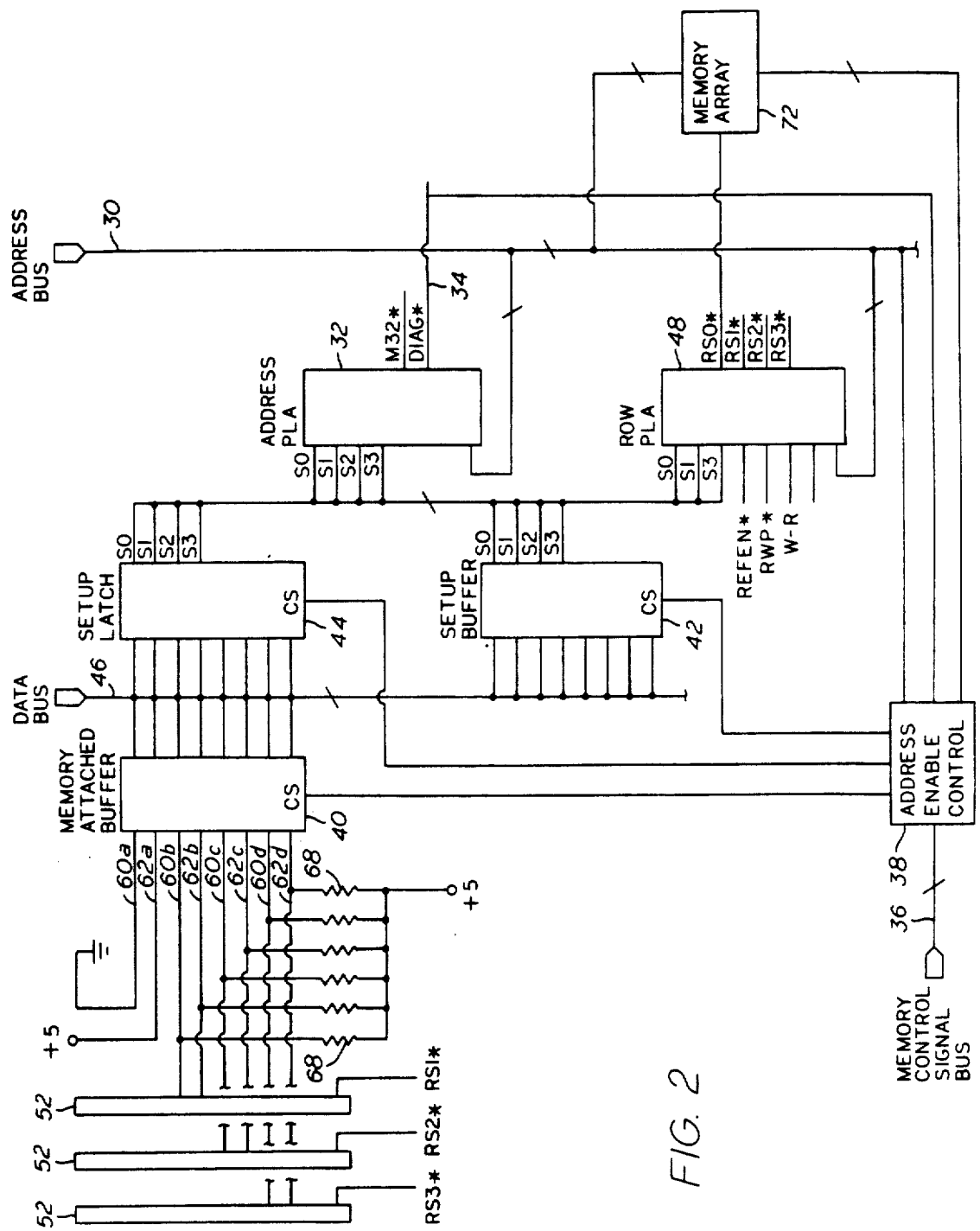
FIG. 2 is a schematic diagram of the preferred embodiment of the base memory unit circuitry for use in an apparatus according to the present invention.

In the preferred embodiment, the RAM 14 is contained on a separate board which is inserted in the computer system C. This board contains a base memory unit B (FIG. 2) and further connections to additional memory modules (FIGS. 3A and 3B) to allow expansion without using additional connector locations in the basic system unit.

The separate board contains components (FIG. 2) which allow the processor 10 to determine the amount and location of installed memory. The processor 10 addresses a memory location referred to as the diagnostic port. The lines forming the address bus 30 are decoded by an address interpretation programmable logic array (PLA) 32. The address PLA 32 evaluates the various inputs, which include the lines containing the address from the processor 10 and a series of signals representing the maximum usable memory. The address PLA 32 is programmed such that if the address presented is the address assigned the diagnostic port, line 34, which is logically represented as the DIAG* signal, is driven to a low or active level, indicating an access to the diagnostic port. Address enable control logic 38 uses the DIAG* signal in conjunction with the appropriate signals on a memory control signal bus 36 and additional signals on the address bus 30 which were not utilized by the address PLA 32 to determine which of a series of buffers or latches forming the diagnostic port is being addressed by the processor 10. Information is obtained from the buffers during a read operation and written to and stored in the latches during a write operation.

In the preferred embodiment the diagnostic port includes three buffers, one for determining parity error locations (not shown); one for determining memory attached, the memory attached buffer 40; and one for checking the setup values, the setup buffer 42. The buffers preferably have sequential addresses so that they can be read in a single operation, such as a 32 bit read when the processor is an Intel Corporation 80386. The diagnostic port preferably contains two latches, the first being the setup latch 44 which is used to store the value representing the maximum usable memory. The other latch is used for other features and is not shown. Additionally, in the preferred embodiment any write operation to the diagnostic port clears any memory parity error flags.

The memory modules 50 (FIGS. 3A and 3B) are installed in connectors 52 located on the memory board. Thus there are distinguishing physical locations for the various memory modules 50 and the base memory unit B. In the preferred embodiment the memory modules 50 must be installed in consecutive locations and certain combinations of module sizes and locations are not allowed to ease memory addressing control. However, this is a limitation in a preferred embodiment for cost reasons, and an apparatus according to the present invention in an alternate embodiment can allow full location and combination variability.

The memory modules 50 contain the necessary control logic 54 and an appropriately sized memory array 56 to allow the memory module 50 to interact with the base memory unit B and the processor 10.

The inputs to the memory attached buffer 40 are four pairs of lines 60a-d and 62a-d which transmit signals which indicate the amount of memory on the base memory unit B and each of the three memory modules 50. In the preferred embodiment, two memory size options are available for each of these four locations, 1 Mbyte or 4 Mbytes. A third size exists for the memory modules 50 because the module 50 may not be installed, thus generating a zero memory size state. Therefore, two bits of information are needed to convey the three possible memory size states. A signal value of 11 on the associated lines 62 and 60, respectively, indicates that no memory is installed in that location. A signal value of 01 indicates that a 4 Mbyte grouping of memory is installed in that location, while a 10 indicates that 1 Mbyte of memory is installed in that location. The signal value 00 is reserved for future use.

Because the base memory unit B always has memory installed, a value of 11 for the base unit indicates an error condition in the base unit logic. A value of 00 indicates erroneous operation of that location for some reason, either logic failure for that location or installation of an incompatible module.

These memory size input signals have determined permanent values for the base memory unit B and each memory module 50 which need not be altered by the person installing the memory. On the base memory unit B, the lines 60a and 62a are directly wired to ground or high level voltage as appropriate to produce the desired size signal. The traces on the printed circuit board are routed so that only the appropriate size value is developed for the base memory unit B. No Jumpers or switches need be set.

On the memory modules 50, lines 64 and 66, which connect to the lines 60 and 62 connected to the proper connector 52, are also permanently fixed to the appropriate level by connection to ground or logic level high by routing of the traces on the printed circuit board of the memory module 50. The input lines 60b-d and 62b-d to the memory attached buffer 40 from the memory modules 50 are pulled up to a high level through resistors 68 so that a 11 state is present when a memory module 50 is not installed. When a memory module 50 is installed, the connection to ground on the module 50 pulls down the voltage on the associated line, developing a zero value for that signal. The line to be connected to a logic level high on a memory module 50 can be, but need not be, connected to a high level voltage, but indeed can be open or unconnected, causing the pullup resistor 58 to not be overridden, thus reducing the complexity of the printed circuit board of the memory module 50.

The processor 10 reads the configuration port and thus receives from the data bus 46 the states of the various memory size signals. The value of the memory size byte, the configuration value, is then used in conjunction with a data table located in the main ROM 16. The data table can take several forms, depending on the amount of main ROM 16 available, the desired flexibility of memory module 50 installation, and the desired level of error support provided.

Figure 4A:
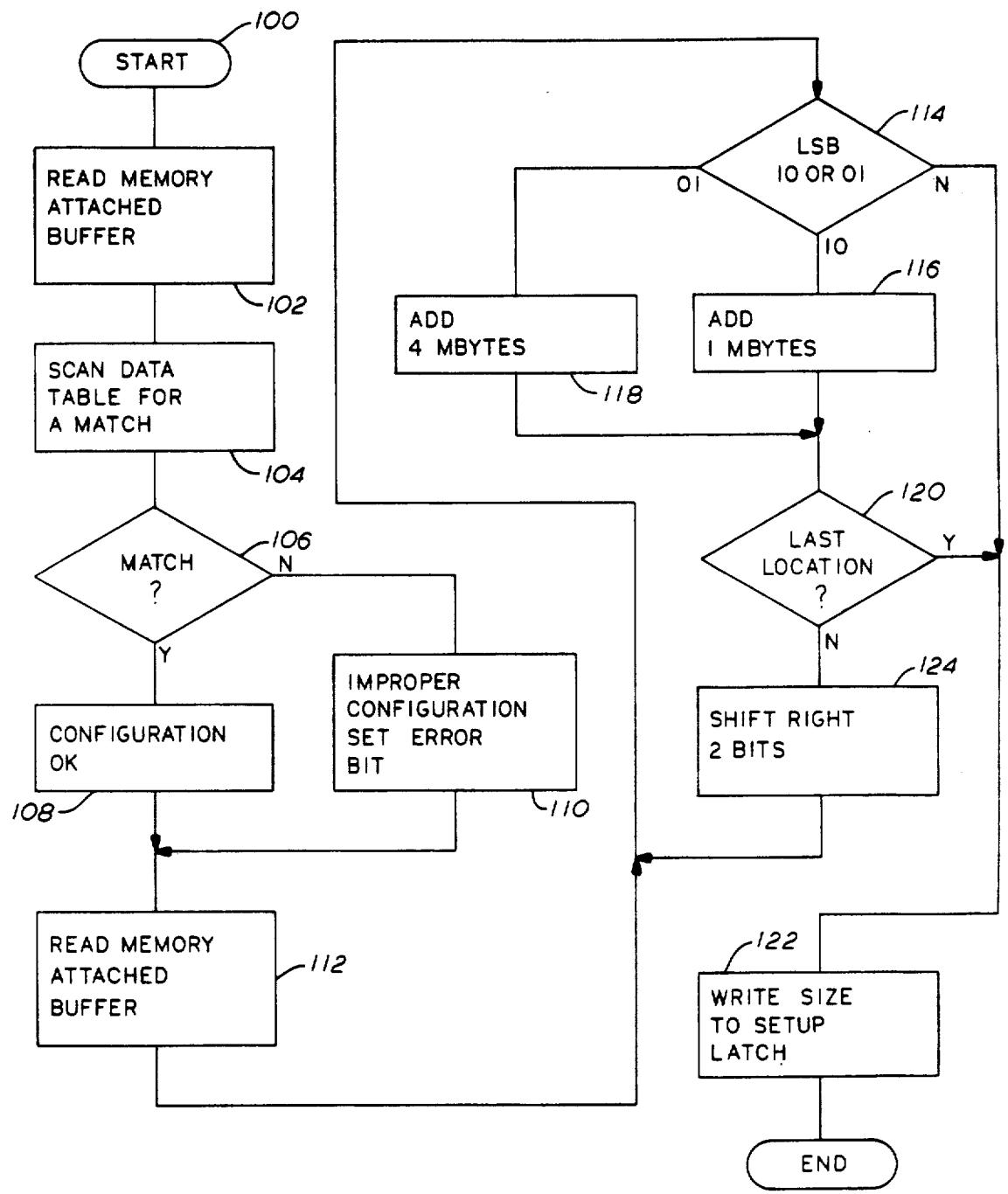
FIGS. 4A, 4B and 4C are alternative flowchart illustrations of operating sequences of an apparatus according to the present invention.

In one embodiment, the data table contains 26 entries. These entries are the 26 valid configurations of the base memory unit B and the memory modules 50. If the value obtained from the memory attached buffer 40 is not one of these values, the installation is in error or not working properly and an error bit is set. This procedure is illustrated in a first setup sequence 100 (FIG. 4A). The processor 10 starts by reading the memory attached buffer 40 in step 102. The 26 entry data table is scanned in step 104. In step 106 a determination is made if a match was found in the table with the read configuration value. If a match was found, control proceeds to step 108 where it is indicated that the configuration installation and operation are satisfactory. If no match was found, control proceeds to step 110, where an improper configuration bit is set for later use by other portions (not shown) of the operating programs. After step 108 or step 110, control proceeds to step 112, where the memory attached buffer 40 is read again to determine the value to be written to the setup latch 44.

In the next step, step 114, a determination is made whether the least significant or right most two bits of the configuration value are 10 or 01. If the value is a 10, step 116 causes a one to be added to the memory size counter. If the value is an 01, step 118 causes a four to be added to the memory size counter to indicate a 4 Mbyte memory location. Following either step 116 or step 118, a determination is made in step 120 if all four physical memory locations have been evaluated. If so, control proceeds to step 122 where the memory size counter is written to the setup latch 44. Following this operation, control proceeds to the next operation in the operating program.

If the location just evaluated was not the last location, control proceeds to step 124 where the configuration value is shifted two bits right so that the next location can be evaluated. Control returns to step 114 for evaluation.

If step 114 determines that the two bits are not 10 or 01, control proceeds to step 122. This branch is taken if not all the memory modules 50 are installed or if an erroneous location value is determined. If the memory modules 50 are not installed in consecutive locations, starting at the first location, their size will not be evaluated. This is desirable in the preferred embodiment to reduce complexity and because the address location of the memory board is assumed to start at zero and proceed until all of the usable memory on the memory board is utilized. If a memory module 50 is not installed consecutively, this automatically results in an error condition determination in step 106 because no skipped physical locations exist in the lookup table.

This embodiment of the apparatus of the present invention offers the least error support and flexibility of memory module 50 installation, but is also the least expensive, in terms of the amount of main ROM 16 utilized and circuit component complexity.

In an alternate embodiment, the lookup table is 256 entries long so that all possible combinations of the configuration can be correlated with the maximum usable memory size, which is a portion of the information contained in the data of the lookup table at each location. The remaining information in each lookup table location indicates any errors for that configuration, such as improper installation, reserved states operation or bad base unit logic. Exemplary portions of the data table addressing and contained data for this embodiment are as follows:

| Configuration Value | Installed Bank Size (Mbyte) | Setup Latch Value | Error Code |
|---|---|---|---|
| 11 11 11 11 | 0 0 0 0 | 0 0 0 0 | 01 |
| 11 11 11 10 | 1 0 0 0 | 0 0 0 1 | 00 |
| 11 11 11 01 | 4 0 0 0 | 0 1 0 0 | 00 |
| 11 11 11 00 | X 0 0 0 | 0 0 0 0 | 11 |
| 11 11 10 11 | 0 1 0 0 | 0 0 0 0 | 01 |
| 11 11 10 10 | 1 1 0 0 | 0 0 1 0 | 00 |
| 11 11 10 01 | 4 1 0 0 | 0 1 0 1 | 00 |
| 11 11 10 00 | X 1 0 0 | 0 0 0 0 | 11 |
| • | • | • | • |
| 11 10 11 11 | 0 0 1 0 | 0 0 0 0 | 01 |
| 11 10 11 10 | 1 0 1 0 | 0 0 0 1 | 10 |
| 11 10 11 01 | 4 0 1 0 | 0 1 0 0 | 10 |
| 11 10 11 00 | X 0 1 0 | 0 0 0 0 | 11 |
| 11 10 10 11 | 0 1 1 0 | 0 0 0 0 | 01 |
| 11 10 10 10 | 1 1 1 0 | 0 0 1 1 | 00 |
| 11 10 10 01 | 4 1 1 0 | 0 1 1 0 | 00 |
| 11 10 10 00 | X 1 1 0 | 0 0 0 0 | 11 |
| 11 10 01 11 | 0 4 1 0 | 0 0 0 0 | 01 |
| 11 10 01 10 | 1 4 1 0 | 0 1 0 1 | 10 |
| 11 10 01 01 | 4 4 1 0 | 1 0 0 1 | 00 |
| 11 10 01 00 | X 4 1 0 | 0 0 0 0 | 11 |
| 11 10 00 11 | 0 X 1 0 | 0 0 0 0 | 01 |
| 11 10 00 10 | 1 X 1 0 | 0 0 0 1 | 11 |
| 11 10 00 01 | 4 X 1 0 | 0 1 0 0 | 11 |
| 11 10 00 00 | X X 1 0 | 0 0 0 0 | 11 |
| • | • | • | • |
| 00 00 01 11 | 0 4 X X | 0 0 0 0 | 01 |
| 00 00 01 10 | 1 4 X X | 0 1 0 1 | 11 |
| 00 00 01 01 | 4 4 X X | 1 0 0 0 | 11 |
| 00 00 01 00 | X 4 X X | 0 0 0 0 | 11 |
| 00 00 00 11 | 0 X X X | 0 0 0 0 | 01 |
| 00 00 00 10 | 1 X X X | 0 0 0 1 | 11 |
| 00 00 00 01 | 4 X X X | 0 1 0 0 | 11 |
| 00 00 00 00 | X X X X | 0 0 0 0 | 11 |

There are four error codes. Error code 00 indicates that the memory installation and operation are satisfactory. A 01 error code indicates that the base memory unit B is malfunctioning because a configuration value of zero memory on the base memory unit B was read, a value which cannot exist in the preferred embodiment because some memory is always on the base memory unit B. A 10 error code represents improper installation of at least one memory module. The operator is directed to written documentation supplied with the memory board for proper installation. A setup latch value is provided because some memory is usable, while other memory is not usable, generally because the module addresses are not contiguous because the modules have not been installed consecutively. Infrequently, improper installation can occur because different sized modules must be placed in a certain order in the preferred embodiment to reduce complexity of the control circuitry.

Finally, an error code of 11 indicates that one location has indicated that a device having the reserved memory size value has been installed. This is an improper condition and indicates failure of components in the base memory unit B or installation of an improper module. An error message along these lines can be provided to the operator to aid in error analysis.

Figures 4B, 4C:
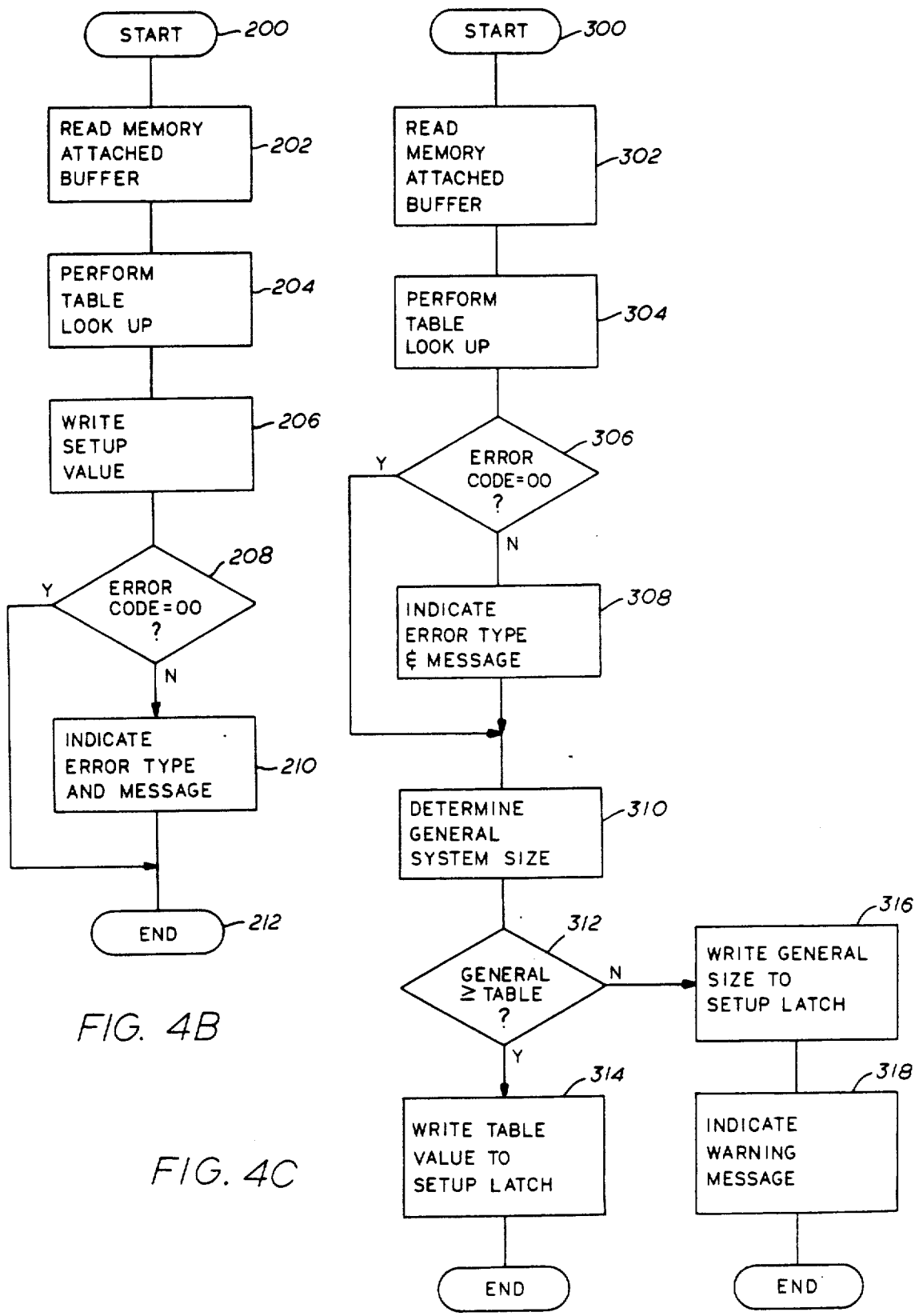

A second setup sequence 200 (FIG. 4B) illustrates a manner of using this lookup table format. The processor 10 commences operation at step 202, where the memory attached buffer 40 is read. The configuration value which is obtained is used to address the lookup table in step 204, where the setup latch value and error code are obtained for that configuration value. The setup latch value, which represents the maximum usable memory size, is written to the setup latch 44 in step 206. Next, a determination is made in step 208 if the memory configuration and operation are satisfactory. If not, control proceeds to step 210 where the error code and appropriate error message is indicated for proper action. Following this indication, or if the memory configuration was satisfactory, control proceeds to step 212, where control proceeds to the next step in the operating sequence.

One of the parameters contained in the CMOS 18 is the general system memory size. This value can be compared with the maximum value obtained from the lookup table to determine the value written to the setup latch 44 to enable the memory on the memory board. If the general system memory size and the maximum usable memory size values are not equal, the lesser of the two values is written to the setup latch 44 and a warning message issued if the maximum usable value is greater than the general system memory size. In this way, the operator can designate a reduced amount of memory on the memory board to be used each time by setting the value in the CMOS 18 as desired, without having to run a special procedure to reduce the amount of enabled memory.

A setup sequence 300 (FIG. 4C) illustrates a procedure for performing this alternative embodiment. The processor 10 commences operation at step 302 where the memory attached buffer 40 is read. The configuration value obtained is utilized in a lookup table in step 304. Setup latch 44 and error code values are obtained from the lookup table. Next, a determination is made in step 306 if the configuration is satisfactory. If not, the error type and appropriate message are indicated in step 308. Control proceeds from step 306 or step 308 to step 310, where the CMOS 18 is read and the general system memory size value is obtained. The general value is compared with the lookup table value in step 312. If the general value equals or exceeds the table value, the normal situation where the memory board contains some or all of the RAM 14 in the personal computer C, control proceeds to step 314 where the table value is written to the setup latch 44 for use by the base memory unit B. Control then proceeds to the next step in the operating sequence.

If the general size value was less than the maximum usable size as determined from the data table, control proceeds to step 316 where the general system size value is written to the setup latch 44. In this circumstance there is usable memory which is not being utilized. After writing to the setup latch 44, control proceeds to step 318, where the appropriate warning message is indicated, and then to the next step in the operating sequence.

The output lines 70 of the setup latch 44 are connected to a setup buffer 42 (FIG. 2) to allow the setup value to be determined at a later time. The capability to separately read and write the setup value allows an operator to reduce the maximum amount of memory addressed by the operating system. The operator writes the desired value to the setup latch 44 and the memory utilized on the memory board is decreased. This is useful should the system be configured to include special, dedicated memory in locations that would otherwise be occupied by the memory on the memory board.

The output lines 70 are also connected to the address PLA 32 for use in determining if memory within the possible address space of the memory board and actually usable as indicated by the setup value is being addressed. The address PLA 32 utilizes all four bits of the setup value to fully decode the setup value, so that the signal M32* goes active only when memory within the proper address space and usable is addressed. The M32* signal is utilized by buffers (not shown) in other portions of the personal computer C to enable data from the memory board to be placed on the system data bus.

Additionally, three of the four bits of the setup value are provided to a row selection PLA 48. The use of only three bits is possible because of the limitations in the preferred embodiment of the memory module 50 locations and because of the full decoding by the address PLA 32. The use of three bits allows a memory location not usable to be enabled for a read operation, but the invalid data does not reach the requesting device because the buffer controlled by the M32* signal is not enabled. During a write operation, a write is actually performed to an unusuable location, but this does not matter because the location cannot be read, and if truly a valid operation to that address, the information is received by other memory in the computer system C as desired. If no memory in the RAM 14 exists at that address location, it is an improper operation and the results are irrelevant.

The row selection PLA 48 includes other inputs, including the appropriate memory addresses from the address bus 30, a refresh signal referred to as REFEN*, a ROM write protect signal RWP*, a signal referred to as W-R which indicates whether a write or read operation is being requested and other signals necessary for refresh operations. The outputs of the row selection PLA 48 include four signals, referred to as RS0*, RS1*, RS2* and RS3*, for enabling row address selection on the base memory unit B and each of the three memory modules 50, respectively. The row selection PLA 48 is encoded so that the proper RSn* is made active based on the setup value and the address being asserted.

The RWP* and W-R signals are utilized because in the preferred embodiment a main ROM 16 replacement feature is utilized which allows the software contained in the main ROM 106 to be written to the RAM 14 to increase the speed of operation of the personal computer C. To maintain similarity to the main ROM 16, any write operations to the replacement locations are prohibited when the RWP* signal is active. In those instances, the otherwise appropriate RSn* signal is not made active.

The REFEN* signal is utilized by the row selection PLA 48 because it is necessary to make all four RSn* signals active at the same time during dynamic memory refresh operations to ease refreshing operations and shorter refresh time requirements.

While the designs of the various alternative embodiments previously discussed do not contain provisions for locating any size memory module 50 at any connector location, this is done to reduce row selection PLA 48 complexity and the lookup table size requirements. By increasing the lookup table size and the number of terms in the PLA or similar device to include all sufficient size for possible alternatives, the size and location limitations of the discussed embodiments would be removed.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

What is claimed is:

1. An apparatus for determining usable memory size, comprising:
   a base memory unit, said base memory unit including:
     an amount of base memory;
     means for indicating the amount of base memory; and
     means for receiving at least one additional memory module, each of said additional memory modules including:
       an amount of additional memory;
       means for indicating the amount of additional memory; and
       means for connecting said additional memory module to said base memory unit, said means for connecting including means for coupling the output of said additional memory indicating means to said base memory unit;
   wherein all said means for indicating are permanent connections on said base memory unit and on said additional memory module;
   means for receiving the outputs from all said indicating means;

means responsive to said received indicating means outputs for correlating said received indicating means outputs with maximum usable amount of memory for a given configuration signal value corresponding to said indicating means outputs, wherein said maximum usable amount varies dependent on the amount and physical location combinations of said base memory and any additional memory, some of said memory module additional memory amount and physical location combinations resulting in inaccessibility of some of said amount of additional memory, and for outputting a value indicative of said maximum usable amount of the amount of said base memory and said additional memory actually present; and means responsive to said maximum usable amount value for generating enabling signals for enabling an amount of said base memory and said additional memory totaling said maximum amount.

2. The apparatus of claim 1, wherein said means for enabling an amount of memory further includes:

means for determining a desired amount of memory; and means for setting the amount of memory enabled at the lesser of the desired amount or the maximum usable amount.

3. The apparatus of claim 1, further including means responsive to said received indicating means outputs for indicating improper installation of said additional memory module.

4. The apparatus of claim 1, further including means responsive to said received indicating means outputs for indicating erroneous base memory unit operation.

5. The apparatus of claim 1, further including means responsive to said received indicating means outputs for indicating invalid operation of the apparatus.

6. The apparatus of claim 1, wherein said permanent connections include a plurality of lines, each of said lines held to a high or a low state.

7. The apparatus of claim 1, wherein said means for correlating includes means for storing a table of information and means for accessing said table.

* * * * *